(12) United States Patent
Liu et al.

(10) Patent No.: US 12,530,114 B1
(45) Date of Patent: Jan. 20, 2026

(54) SYSTEMS AND METHODS FOR PROVIDING AN INTERACTIVE SEXUAL ENTERTAINMENT PLATFORM

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/961,459

(22) Filed: Nov. 27, 2024

Related U.S. Application Data

(63) Continuation-in-part of application No. 18/589,042, filed on Feb. 27, 2024, which is a continuation of application No. 17/717,917, filed on Apr. 11, 2022, now Pat. No. 11,938,078, which is a continuation of application No. 16/352,876, filed on Mar. 14, 2019, now Pat. No. 11,311,453.

(51) Int. Cl.
*G06F 3/04847* (2022.01)

(52) U.S. Cl.
CPC .............................. *G06F 3/04847* (2013.01)

(58) Field of Classification Search
CPC .................................................. G06F 3/04847
See application file for complete search history.

(56) References Cited

U.S. PATENT DOCUMENTS

| | | | |
|---|---|---|---|
| 2014/0243590 A1* | 8/2014 | Fang | A61H 23/02 600/38 |
| 2015/0328082 A1* | 11/2015 | Jiang | A61H 23/02 600/38 |
| 2022/0233396 A1* | 7/2022 | Liu | A61H 19/34 |
| 2023/0042605 A1* | 2/2023 | Cambridge | G06Q 20/29 |
| 2023/0346631 A1* | 11/2023 | Siles | A61H 19/32 |

\* cited by examiner

*Primary Examiner* — Seth A Silverman
(74) *Attorney, Agent, or Firm* — Holtz, Holtz & Volek PC

(57) ABSTRACT

The present invention relates to methods and systems for providing an interactive sexual entertainment platform. The method performed by an system includes providing an interaction tool defined with an interaction result factor in content rendered on an interactive platform. The interaction tool facilitates interaction between a first set of users and a second set of users. The method includes receiving input data from the second set of users to interact with the interaction tool rendered in the content. Further, the method includes computing an interaction level indicator for the second set of users based on the input data of the second set of users. The method includes generating at least one outcome of the interaction tool. The at least one outcome includes a third set of users among the second set of users. The method includes providing a response to the third set of users for providing sexual entertainment.

20 Claims, 11 Drawing Sheets

SYSTEMS AND METHODS FOR PROVIDING AN INTERACTIVE SEXUAL ENTERTAINMENT PLATFORM

TECHNICAL FIELD

The present invention relates to electronic-based adult entertainment systems and methods, and more particularly relates to systems and methods for providing an interactive sexual entertainment platform to users to experience enhanced sexual pleasure.

BACKGROUND

Sexual stimulation can be achieved by an individual or a group of individuals (irrespective of gender) by using various means. Conventionally, self-operated sex toys are used by an individual for experiencing sexual stimulation. However, the individual may not always feel the same level of sexual stimulation at every instance using conventional sex toys as they have limited operating functionality.

Currently, social media and the ability to extend wireless interfaces, local and wide area networking, etc., have contributed to new methods and systems for experiencing sexual stimulation. In an example scenario, the individual may access pornographic live performances of models through online streaming platforms (for example, pornographic live streaming platforms) that host live performances. In general, the existing online streaming platforms are designed to facilitate real-time communication between streamers and their audience. However, various technical and social challenges can arise that lead to interaction-related problems in the existing online streaming platforms and significantly affect user experience and engagement. In some scenarios, the existing online streaming platforms offer minimal interaction features to the audience, hence resulting in limited interaction between the audience and the streamers. In an example scenario, the interaction features like viewer-controlled events or in-game decisions may not sync with the stream's slight delay. Thus, the limited interaction features on the existing online streaming platforms negatively impact user experience and engagement. To that effect, the audience may feel disconnected or less engaged with the streamers. Further, the audience often seeks a personalized experience in the pornographic live performances. If the interaction features are limited, the audience may not feel the ability to tailor content as per their preferences.

Therefore, there is a need for systems and methods for providing an interactive adult entertainment platform to users that overcome the aforementioned deficiencies along with providing other advantages.

SUMMARY

Various embodiments of the present disclosure disclose methods and systems to provide an interactive sexual entertainment platform.

In an embodiment, a computer-implemented method is disclosed. The computer-implemented method performed by an system includes providing an interaction tool defined with an interaction result factor in content rendered on an interactive platform. The interaction tool facilitates interaction between a first set of users and a second set of users in the interactive platform. The method includes receiving at least one input data associated with the second set of users to interact with the interaction tool rendered in the content. Further, the method includes computing an interaction level indicator for each of the second set of users based at least on the at least one input data associated with each of the second set of users. The method further includes generating at least one outcome of the interaction tool based on a set of interaction rules defined for the interaction tool and the interaction level indicator associated with each of the second set of users. The at least one outcome of the interaction tool includes at least a set of user indentities indicating at least a third set of users among the second set of users. Furthermore, the method includes providing a response defined for the interaction result factor to the set of users of the second set of users in the interactive platform. The response is configured to provide an interaction result entity associated with the first set of users to the third set of users.

In another embodiment, a system is disclosed. The system includes a communication interface, a memory storing executable instructions, and a processor operatively coupled with the communication interface and the memory. The processor is configured to execute the executable instructions to cause the system to at least provide an interaction tool defined with an interaction result factor in content rendered on an interactive platform. The interaction tool facilitates interaction between a first set of users and a second set of users in the interactive platform. Further, the processor is configured to receive at least one input data associated with the second set of users to interact with the interaction tool rendered in the content. The processor is configured to compute an interaction level indicator for each of the second set of users based at least on the at least one input data associated with each of the second set of users. Further, the processor is configured to generate at least one outcome of the interaction tool based on a set of interaction rules defined for the interaction tool and the interaction level indicator associated with each of the second set of users. The at least one outcome of the interaction tool includes at least a set of user identities indicating at least a third set of users among the second set of users. Furthermore, the processor is configured to provide a response defined for the interaction result factor to the set of users of the second set of users in the interactive platform. The response is configured to provide an interaction result entity associated with the first set of users to the third set of users.

In another embodiment, a non-transitory computer-readable storage medium is disclosed. The non-transitory computer-readable storage medium includes computer-executable instructions that, when executed by a system, cause the system to perform a method including providing an interaction tool defined with an interaction result factor in content rendered on an interactive platform. The interaction tool facilitates interaction between a first set of users and a second set of users in the interactive platform. The method includes receiving at least one input data associated with the second set of users to interact with the interaction tool rendered in the content. Further, the method includes computing an interaction level indicator for each of the second set of users based at least on the at least one input data associated with each of the second set of users. The method further includes generating at least one outcome of the interaction tool based on a set of interaction rules defined for the interaction tool and the interaction level indicator associated with each of the second set of users. The at least one outcome of the interaction tool includes a set of user identities indicating at least a third set of users among the second set of users. The method includes providing a response defined for the interaction result factor to the set of users of the second set of users in the interactive platform, The response is configured to provide an interaction result entity associated with the first set of users to the third set of users.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 7.

Figure 1:
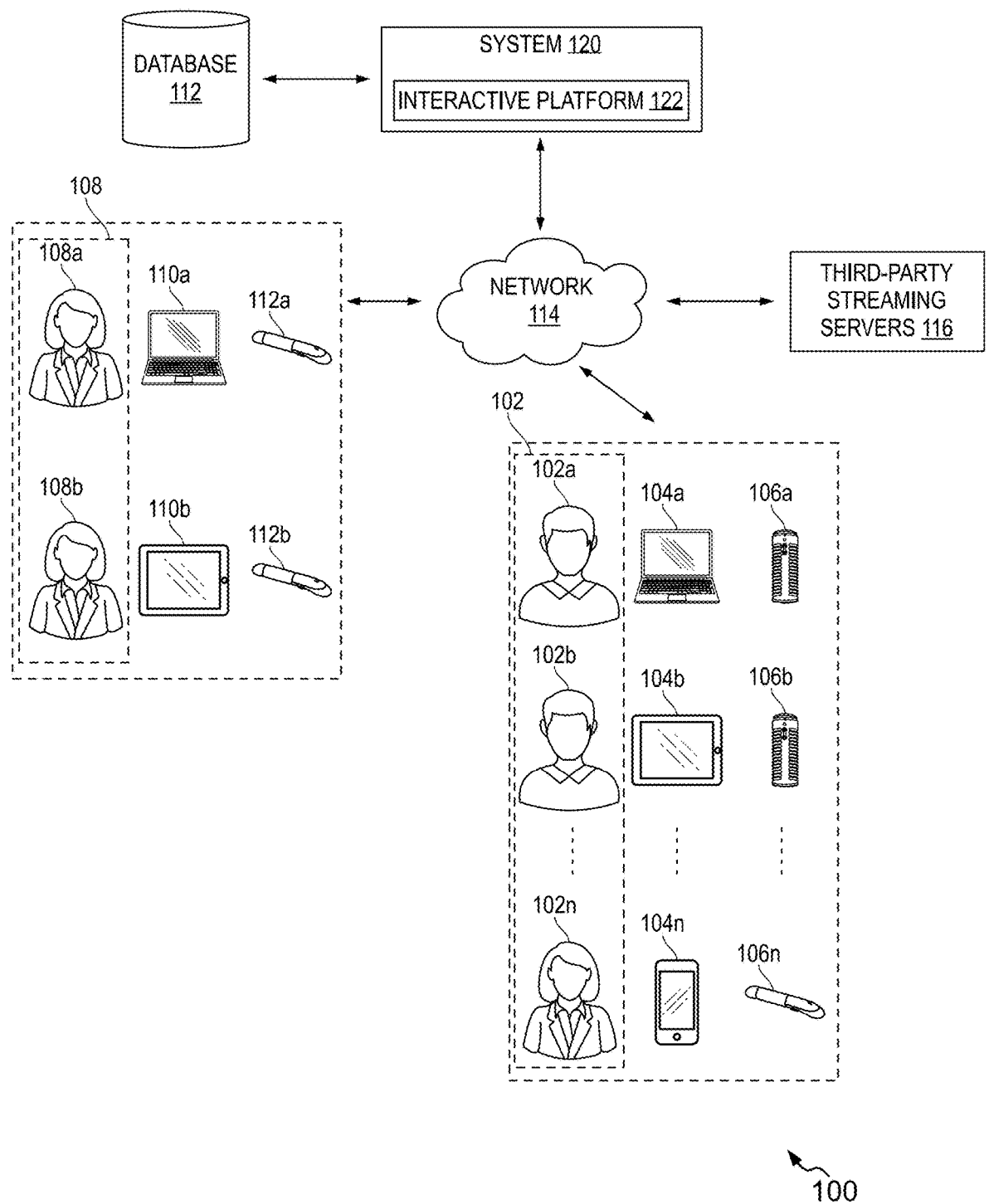
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a second set of users (collectively referring to a user 102a, a user 102b, . . . a user 102n, where 'n' represents a natural number). The users 102a-102n are collectively referred to as the second set of users 102. Each of the second set of users 102a, 102b, . . . 102n is respectively associated with a user device 104a, a user device 104b, . . . a user device 104n, where 'n' is a natural number. The user devices 104a-104n may include at least a laptop computer, a phablet computer, a handheld personal computer, a virtual reality (VR) device, a netbook, a Web book, a tablet computing device, a smartphone, or other mobile computing devices.

Further, the environment 100 includes a first set of users 108. The first set of users 108 includes a user 108a and a user 108b. In an embodiment, the first set of users 108 may be referred to as model users who perform content (e.g., sexual content, pornographic live broadcast, or sexual content broadcasting). For illustration purposes, only two model users (or the users 108a-108b) are depicted in FIG. 1, however, there can be any number of users in the first set of users 108. Furthermore, the users 108a and 108b are respectively associated with a user terminal 110a (exemplarily depicted to be a laptop computer) and a user terminal 110b (exemplarily depicted as a tablet computing device). In an embodiment, the first set of users 108 may use their user terminals 110a and 110b for capturing the sexual content or pornographic live performances of the first set of users 108. In another embodiment, the first set of users 108 may utilize an image capturing module (not shown in figures) connected (wired/wirelessly connected) to the respective user terminals 110a and 110b to capture the sexual content being performed by the first set of users 108.

Furthermore, the users 102a, 102b. 102n are associated with a sexual stimulation device 106a, a sexual stimulation device 106b, . . . a sexual stimulation device 106n, respectively. The users 108a-108b are associated with an accessory 112a and an accessory 112b. For example, the accessories 112a and 112b may be an adult toy. The sexual stimulation devices 106a-106n and the accessories 112a and 112b may be selected based on the gender of the first set of users 108 and the second set of users 102. For example, the sexual stimulation devices 106a and 106b may be male sex toys, and the sexual stimulation device 106n, the accessory 112a, and the accessory 112b may be female sex toys. Some examples of female sex toys may include, but are not limited to, a dildo, a vibrator, and the like. Some examples of male sex toys may include masturbators. The sexual stimulation devices 106a-106n may be connected wirelessly with the respective user devices 104a-104n. Further, the accessories 112a and 112b may be connected wirelessly to the user terminals 110a and 110b. Some examples of the wireless connectivity may be, but are not limited to, Near-Field communication (NFC), wireless fidelity (Wi-Fi), Bluetooth, and the like.

Various entities in the environment 100 may connect to a network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 114 may include a secure protocol (e.g., Hypertext Transfer Protocol (HTTP)), and/or any other protocol, or set of protocols. In an example embodiment, the network 114 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a system 120. The system 120 may be embodied in at least one computing device in communication with the network 114. In an embodiment, the system 120 may be embodied in the user devices 104a-104n. The system 120 may be specifically configured, via executable instructions to perform one or more of the operations described herein. In general, the system 120 is configured to provide adult entertainment which will be explained further in detail. Further, the system 120 is configured to provide an interactive platform 122 to facilitate interaction between the first set of users 108 and the second set of users 102 and provide an interactive sexual entertainment experience. The interactive platform 122 may be hosted and managed by the system 120. Further, one or more components of the interactive platform 122 may be stored in a database 118 associated with the system 120. In an embodiment, the interactive platform 122 may be hosted by a third-party application server (not shown in figures) and communicably coupled to the network 114. The interactive platform 122 is a set of computer-executable codes configured to allow the first set of users 108 to create content (e.g., a live broadcast or pornographic live streaming performances) for the second set of users 102. In one embodiment, the interactive platform 122 may be accessed as a web-based application on the user devices 104a-104n and the user terminals 110a-110b. In another embodiment, the user devices 104a-104n and the user terminals 110a-110b may access an instance of the interactive platform 122 from the system 120 for installing on the user devices 104a-104n and the user terminals 110a-110b using application stores associated with operating systems such as Apple IOS®, Android™ OS, Google Chrome OS, Symbian OS®, Windows Mobile® OS, and the like.

As explained above, the first set of users 108 accesses the interactive platform 122 to render the content to the second set of users 102. For example, the user 108a may access the interactive platform 122 to perform the content (e.g., pornographic live performance). The second set of users 102 (or the users 102a-102n) accesses the content of the user 108a through the interactive platform 122. Further, the system 120 is configured to render an interaction tool defined with an interaction result factor in the content rendered on the interactive platform 122. In this scenario, the interaction tool facilitates interaction between the first set of users (i.e., the user 108a) and the second set of users 102.

In an embodiment, the interaction tool may be rendered in the content based on user inputs provided by the user 108a. In another embodiment, the interaction tool may be rendered based on determining at least one trigger event performed by the user 108a in the content. The at least one trigger event may include gesture inputs of the user 108a, body parts of the user 108a, and the like. In one example scenario, the interaction tool rendered in the content performed by the user 108a may include games (adult content games).

Alternatively, the interaction tool may include sexual tasks such as performing masturbation actions.

In one embodiment, the interaction result factor may be defined by the system 120. In another embodiment, the first set of users 108 may define the interaction result factor for the interaction tool. For example, the first set of users 108 may provide an audio input defining the interaction result factor for the interaction tool. Further, the interaction result factor corresponds to a reward entity defined for the interaction tool. For example, the interaction tool rendered in the content of the user 108a is a game. In this scenario, the reward entity (or the interaction result factor) defined for the interaction tool (i.e., the game) may be provided to the winner of the game. In an embodiment, the interaction result factor may be predefined in the interactive platform 122. In another embodiment, the interaction result factor defined for the interaction tool may be dynamically updated in the interactive platform 122 based at least on at least one input data associated with the second set of users 102 which will be explained further in detail.

The second set of users 102 provides the at least one input data to interact with the interaction tool rendered in the content. The at least one input data may include, but not limited to, a number of tokens provided by the second set of users 102, duration of the second set of users 102 viewing the content of the user 108a rendered in the interactive platform 122, and profile information of the second set of users 102. In this scenario, the system 120 is configured to compute an interaction level indicator for each of the second set of users 102 based at least on the at least one input data associated with each of the second set of users 102. The interaction level indicator corresponds to a probability of winning or progress of winning in the event of the interaction tool (or the game) being rendered by the first set of users 108 in the content. In other words, the system 120 quantifies the interaction level indicator for each of the second set of users 102 based at least on the at least one input data to interact with the interaction tool rendered in the content of the user 108a. Further, a quantified value of the interaction result entity corresponding to the interaction result factor is positively correlated with a total quantified value of the at least one input data received from the second set of users 102. It is to be noted that the quantified value of the interaction result entity may be greater than or equal to a quantified value of the at least one input data received from each user of the second set of users 102.

Further, the system 120 may be configured to monitor one or more parameters associated with the interactive platform 122. The one or more parameters associated with the interactive platform 122 may include, but not limited to, number of viewers of the content, platform identity, etc. Herein, the one or more parameters associated with the interactive platform 122 corresponds to the at least one input data being tracked by the system 120. For example, the online duration increases the probability of winning, such as the probability of winning increasing as the online duration increases. Further, the winning probability of the second set of users 102 the platform identity associated with the second set of users 102. The platform identity defined for the interactive platform 122 may include several identities such as high identity level, medium identity level, and low identity level. Also, the probability of winning or the interaction of the second set of users 102 is quantified based on the platform identity associated with the second set of users 102. The second set of users 102 may select the platform identity by providing inputs in the interactive platform 122. Herein, the platform identity corresponds to the subscription level of the second set of users 102 in the interactive platform 122.

Further, the system 120 determines at least one outcome of the interaction tool based on a set of interaction rules defined for the interaction tool and the interaction level indicator associated with each of the second set of users 102. The at least one outcome of the interaction tool may include a set of user identities indicating at least a third set of users of the second set of users 102. Thus, the at least one outcome of the interaction tool includes the set of user identities indicating the third set of users is determined based at least on identifying the interaction level indicator of the third set of users among the second set of users 102 is greater than a predefined level defined for the interaction tool. For example, the at least one input data may include the number of tokens provided by each of the second set of users 102. In one example scenario, the users 102a, 102b, . . . 102n provide 50 tokens, 20 tokens, and 40 tokens, respectively to interact with the interaction tool rendered in the content of the user 108a. In this example scenario, the interaction level indicator for each of the users 102a, 102b, . . . 102n computed by the system 120 is 60%, 25%, and 50%, respectively. For description purposes, the interaction level indicator is represented as a numerical value. However, the interaction level indicator may be represented in any other format such grade, rank, graphical representation, and the like. Further, the system 120 determines the at least one outcome including the third set of users. In the above example, the third set of users is determined to be the user 102a among the second set of users 102. In other words, the user 102a is selected as a winner among the second set of users 102. It is to be understood that the user among the second set of users 102 who provides the highest number of tokens until the interaction tool is live in the content is selected as the winner. Herein, the highest number of tokens provided to interact with the interaction tool until the interaction tool is live in the content corresponds to the set of interaction rules. Also, the highest number of tokens corresponds is set as the predefined value for the interaction tool by the system 120. It is to be noted that the predefined value is dynamically updated based on the number of tokens being provided by each user of the second set of users 102. In some scenarios, if both the users 102a and 102b may provide 50 tokens to interact with the interaction tool. In this scenario, the third set of users of the at least one outcome includes the users 102a and 102b. Thus, the at least one outcome may include multiple winners.

Upon generating the at least one outcome, the system 120 provides a response defined for the interaction result factor to the third set of users of the second set of users 102 in the interactive platform 122. In the case of a single winner, the third set of users in the at least one outcome includes the user 102a of the second set of users 102. Hence, the response is transmitted to the user 102a. The response is configured to provide an interaction result entity associated with the first set of users (e.g., the user 108a) to the third set of users (e.g., the user 102a) of the second set of users 102. For example, the interaction result entity includes sexual entertainment content. The sexual entertainment content associated with the first set of users (e.g., the user 108a) may include at least operating parameters for controlling an accessory (i.e., the accessory 112a) of the first set of users (e.g., user 108a) and multimedia data of the first set of users (e.g., the user 108a).

In some scenarios, the number of tokens provided by the second set of users 102 may not satisfy the goal or the interaction result factor defined for the interaction tool. In this scenario, the at least one outcome may include no winner or no user among the second set of users 102 is selected as the winner. The at least one outcome with no winner corresponds to a null outcome. The third set of users may be represented using a set of non-negative integers. In one scenario, the system 120 may determine the interaction result factor as a reference result factor for a subsequent interaction tool rendered in the interaction platform 122 based on obtaining the null outcome. In particular, the progress of the interaction result factor for the interaction tool based on the at least one input data associated with the second set of users 102 is used as the reference result factor for the next interaction tool that will be rendered in the content to the second set of users 102. For example, the progress of the interaction result factor may be 75% of 100% for an interaction tool A rendered in the content by the first set of users 108. In this scenario, the interaction result factor of 75% is used as the reference result factor for an interaction tool B that will be rendered later in the interactive platform 122. In another scenario, the system 120 determines a predefined response for the interaction result factor based on obtaining the null outcome. The predefined response for the null outcome may be stored in the database 118. Further, the predefined response is provided to the second set of users 102. For example, the predefined response may include control instructions for operating the sexual stimulation devices 106a-106n associated with the respective second set of users 102 or include the sexual content of the first set of users 102.

In an embodiment, the interactive platform 122 may be a game room, that provides an interaction tool (such as a game), and the first set of users 108 and the second set of users 102 may interact while playing games together in the game room. In some embodiments, the interactive platform 122 may be a virtual dating park where the profiles of the first set of users 108 are distributed, and the second set of users 102 may browse the profiles of the first set of users 108 in the dating park for interacting with the first set of users 108. For example, an interaction tool such as a bidding function may be provided on the profiles of each of the first set of users 108. In this scenario, the second set of users 102 may participate in the bidding and the winner of the second set of users 102 is provided as the interaction result factor defined by the first set of users 108. The interaction result factor defined by the first set of users 108 may be private photos of the first set of users 108, contact information of the first set of users 108, or controlling sex toys (such as the accessories 112a and 112b) of the first set of users 108.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
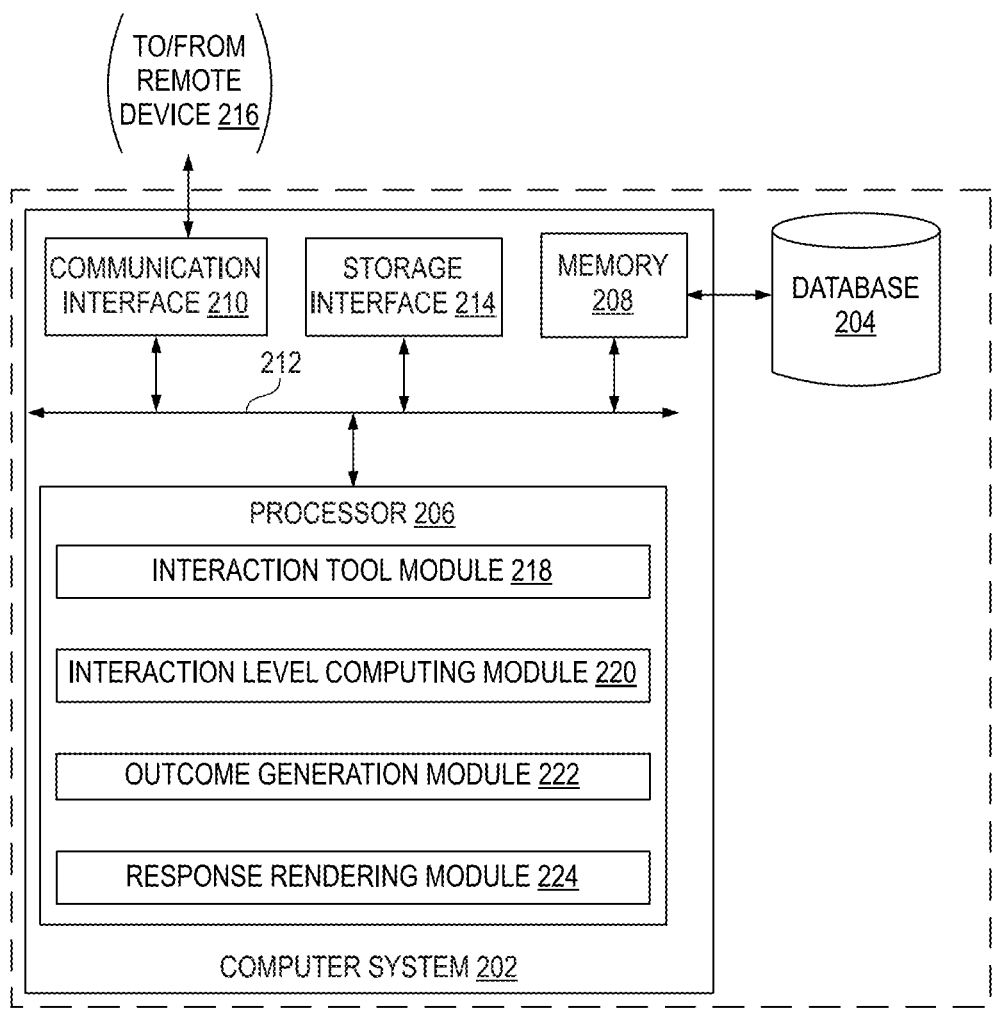
FIG. 2 illustrates a simplified block diagram of an applications server for providing an interactive sexual entertainment platform, in accordance with an embodiment of the present disclosure.

FIG. 2 illustrates a simplified block diagram of an applications server 200 for providing an interactive sexual entertainment platform, in accordance with an embodiment of the present disclosure. Examples of the system 200 may include, but are not limited to, the system 120 as shown in FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the interactive platform 122 and one or more components of the interactive platform 122. In addition, the database 204 is configured to store multimedia content, predefined response, control parameters for operating sexual stimulation devices, the set of interaction rules, and the like. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database or cloud storage working in conjunction with the system 200, without deviating from the scope of the present disclosure.

The processor 206 is operatively coupled to the communication interface 210 such that the processor 206 is capable of communicating with a remote device 216 such as the user devices 104a-104n, the user terminals 110a-110b, or with any entity connected to the network 114 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes an interaction tool module 218, an interaction level computing module 220, an outcome generation module 222, and a response rendering module 224.

The interaction tool module 218 include suitable logic and/or interfaces to render the interaction tool defined with the interaction result factor in the content being rendered on the interactive platform 122. As explained above, the first set of users such as the user 108a accesses the interactive platform 122 to perform the content (e.g., pornographic live performance). The second set of users 102 (or the users 102a-102n) accesses the content of the user 108a through the interactive platform 122. In one example scenario, the user 108a provides inputs in the interactive platform 122 to render the interaction tool in the content. In this scenario, the interaction tool module 218 renders the interaction tool (e.g., the game) in the content of the user 108a based on the inputs provided by the user 108a. The interaction tool rendered in the content of the user 108a allows the second set of users 102 to participate. In an embodiment, the interaction tool module 218 defines the interaction result factor for the interaction tool. In one example scenario, the interaction result factor defined for the interaction tool may be controlling the accessory 112a of the users 108a for a predefined time (e.g., 4 minutes). During the game, the second set of users 102 may provide the tokens to interact with the interaction tool. In another example scenario, the interaction tool module 218 may render the interaction tool such as a comment section in the content of the user 108a and define the interaction result factor to be 'interact one-one with the user 108a for 5 minutes'. In this scenario, the second set of users 102 is required to post comments in the comment section of the content of the user 108a.

The interaction level computing module 220 includes suitable logic and/or interfaces to compute the interaction level indicator for each of the second set of users 102 based at least on the at least one input data associated with each of the second set of users 102. As explained above, the interaction level indicator corresponds to a probability of winning or progress of winning in the event of the interaction tool (or the game) being rendered by the user 108a in the content. The at least one input data associated with the second set of users 102 may be received between a predefined time period defined for the interaction tool (e.g., the game) rendered in the content on the interactive platform 122. In one scenario, the predefined time period may be set by the user 108a. In another scenario, the predefined time period may be set as default for the game that is rendered in the content of the user 108a. For example, the predefined time period is 10 minutes. Hence, the second set of users 102 may provide the tokens to interact with the interaction tool rendered in the content of the user 108a.

Further the interaction level computing module 220 dynamically computes a cumulative amount of the at least one input data (e.g., the tokens) received from the second set of users 102. Furthermore, the at least one input data (e.g., the tokens) received from each of the second set of users 102 may be tabulated. Thereafter, the interaction level computing module 220 computes the interaction level indicator for each of the second set of users 102 based at least on determining a ratio of an amount of the at least one input data (e.g., the tokens) associated with each user of the second set of users 102 to the cumulative amount of the at least one input data (e.g., the tokens) of the second set of users 102. It is to be noted that the cumulative amount of the at least one input data (e.g., the tokens) of the second set of users 102 is computed within the based on the at least one input data received from the second set of users 102 within the predefined time period (e.g., 10 minutes). For example, the number of tokens (or an amount of the at least one input data) associated with the users 102a, 102b, 102n is 100 tokens, 20 tokens, and 50 tokens, respectively. Thus, the cumulative amount of the at least one input data (i.e., the tokens) is the sum of the tokens (100+20+50 tokens) received from the users 102a, 102b, 102n. In one example, the interaction level indicator for the user such as the user 102a may be computed using the following equation:

$$\text{Interaction Level Indicator (user } 102a) = [\text{Token provided by user } 102a/ \\ \text{Cumulative amount of tokens}] \times \\ 100 \\ = [100/170] \times 100 \\ = 58.8\%.$$

For description purposes, the interaction level indicator is represented as a numerical value. The interaction level indicator (58.8%) for the user 102a indicates the probability of winning or progress of winning in the event of the interaction tool (or the game) for the user 102. Similarly, the interaction level indicator is computed for other users such as the users 102b, . . . 102n.

As explained above, the interaction result factor may be predefined or dynamically updated based on the at least one input data. In one example, the interaction result factor for the interaction tool rendered by the user 108a may be predefined as 'controlling the accessory 112a of the user 108a for 2 minutes'. In another example, the interaction tool module 218 may dynamically update the interaction result factor based on the at least one input data received from the second set of users 102. In an example, the user 102a may provide 40 tokens at a first instance. In this scenario, the interaction result factor may be defined as 'controlling the accessory 112a of the user 108a for 2 minutes'. In the subsequent instance, the user 102a may provide 100 tokens. In this scenario, the interaction result factor is dynamically updated as 'controlling the accessory 112a of the user 108a for 4 minutes'. In other words, the more tokens are provided, the interaction result factor is dynamically updated as "the longer the control duration for controlling the accessory 112a". The interaction result factor is dynamically updated based on the amount of tokens (i.e., the at least one input data) associated with the second set of users 102 within the predefined time period of the interaction tool. In another example, the interaction tool module 218 may initially define the interaction result factor to be 'controlling the accessory 112a for 1 minute' and a quantified value for the interaction result factor may be 50 tokens (that is a quantified value for'controlling the accessory 112a for 1 minute' may be 50 tokens). In this example scenario, the user 102a may initially provide the at least one input data such as 40 tokens in the content. As a result, the user 102a is provided with access to control the accessory 112a for 1 minute as defined in the interaction result factor. In particular, the interaction tool module 218 compares the at least one input data with the quantified value to determine if the at least one input data (e.g., 40 tokens) is higher than the quantified value (e.g., 50 tokens). In the above example scenario, the at least one input data (e.g., 40 tokens) is determined to be less than the quantified value (e.g., 50 tokens). In this scenario, the user 102a is provided with access to control the accessory 112a for 1 minute as defined in the interaction result factor. Further, the user 102a may provide 60 tokens in the subsequent instance. In this scenario, the at least one input data (e.g., 60 tokens) is determined to be greater than the quantified value (e.g., 50 tokens) defined for the interaction result factor related to controlling the accessory 112a for 1 minute. As a result, the interaction tool module 218 dynamically updates the interaction result factor (e.g., control the accessory 112a for 4 minutes) in response to determining the at least one input data (e.g., 60 tokens) is greater than the quantified value (e.g., 50 tokens). In addition, the interaction tool module 218 computes an updated quantified value (e.g., 100 tokens) based on the updated interaction result factor (e.g., control the accessory 112a for 4 minutes).

The outcome generation module 222 includes suitable logic and/or interfaces to generate the at least one outcome of the interaction tool based on the set of interaction rules defined for the interaction tool and the interaction level indicator associated with each of the second set of users 102. The at least one outcome of the interaction tool may include at least the third set of users of the second set of users 102. As explained above, the at least one input data may include the number of tokens provided by each of the second set of users 102. In one example scenario, the users 102a, 102b, . . . 102n provide 100 tokens, 40 tokens, and 30 tokens, respectively to interact with the interaction tool rendered in the content of the user 108a. In this example scenario, the interaction level indicator for each of the users 102a, 102b, . . . 102n computed by the system 120 is 58.8%, 23.5%, and 17.6%, respectively.

Further, the outcome generation module 222 identifies the user 102a with the highest number of tokens and generates the at least one outcome. Herein the user 102a is selected as the third set of users among the second set of users 102. In other words, the user 102a is selected as a winner among the second set of users 102. Further, the highest number of tokens provided to interact with the interaction tool until the interaction tool is live in the content corresponds to the set of interaction rules as explained above. In some scenarios, the users 102a and 102b may provide 150 tokens within the predefined time of the interaction tool to interact with the interaction tool. In this scenario, the outcome generation module 222 selects the users 102a and 102b as the third set of users among the second set of users 102. Further, the outcome generation module 222 generates the at least one outcome for the interaction tool rendered by the user 108a. In this scenario, the at least one outcome of the interaction tool includes multiple winners (e.g., the users 102a and 102b).

In some scenarios, the number of tokens provided by the second set of users 102 may not satisfy the goal or the interaction result factor defined for the interaction tool rendered by the user 108a. In this scenario, the outcome generation module 222 generates the at least one outcome with the third set of users. Herein, the third set of users selected among the second set of users 102 is zero though the second set of users 102 provided the at least one input data within the predefined time period of the interaction tool. In other words, no user is selected among the second set of users 102 as the winner of the interaction tool. The at least one outcome with no winner (i.e., the third set of users is determined to be zero) corresponds to the null outcome.

In one scenario, the processor 206 may determine the interaction result factor as the reference result factor for the subsequent interaction tool rendered in the interaction platform 122 based on obtaining the null outcome. In particular, the progress of the interaction result factor for the interaction tool based on the at least one input data associated with the second set of users 102 is used as the reference result factor for the next interaction tool that will be rendered in the content to the second set of users 102. For example, the progress of the interaction result factor may be 85% of 100% for an interaction tool A rendered in the content by the first set of users 108. In this scenario, the interaction result factor of 85% is used as the reference result factor for interaction tool B which will be rendered later in the interactive platform 122.

The response rendering module 224 includes suitable logic and/or interfaces to provide the response defined for the interaction result factor to the third set of users of the second set of users 102 in the interactive platform 122. The response is configured to provide the sexual entertainment content associated with the first set of users 108 to the third set of users of the second set of users 102. In one scenario, the at least one outcome of the interaction tool rendered by the user 108a includes the third set of users such as the user 102a. In this scenario, the response is provided to the user 102a for allowing the user 102a to access the sexual entertainment content of the user 108a. The sexual entertainment content associated with the first set of users 108 may include at least the operating parameters for controlling an accessory (such as the accessories 112a-112b) of the first set of users 108 and multimedia data of the first set of users 108.

In one scenario, the response rendering module 224 activates at least one control feature of an accessory (such as the accessory 112a) associated with the first set of users (i.e., the user 108a) for the third set of users (i.e., the user 102a) of the second set of users 102. The response may include a set of instructions for activating the at least one control feature of the accessory 112a of the user 108a. In other words, the response rendering module 224 activates controlling rights over the accessory 112a of the user 108a for the user 102a. Upon activating the at least one control feature of the accessory 112a, the response rendering module 224 receives at least one operational input from the third set of users (i.e., the user 102a) of the second set of users 102 through the interactive platform 122. In this scenario, the at least one operational input may include motion data generated by the third set of users (i.e., the user 102a) of the second set of users 102 based on operating the sexual stimulation device 106a associated with the third set of users (i.e., the user 102a) of the second set of users 102. The motion data of the sexual stimulation device 106a may be tracked by the user device 104a of the user 102a. Further, the set of instructions appended in the response to activate the at least one control feature of the accessory 112a may include a timing parameter to operate the at least one control feature of the accessory 112a of the first set of users (i.e., the user 108a) in the content. The timing parameter may be derived from the interaction result factor. For example, the interaction result factor defined for the interaction tool is 'control the accessory for 4 minutes'. Thus, the timing parameter is determined to be 4 minutes. Hence, the user 102a is allowed to operate the at least one control feature of the accessory 112a of the user 108a for 4 minutes.

In another scenario, the response rendering module 224 may transmit the response appended with a interface for the accessary such as the accessory 112a of the first set of users 108 (e.g., the user 108a). In this scenario, the response rendering module 224 receives the at least one operational data of the third set of users (i.e., the user 102a) through the interface. For example, the interface may include a control link for controlling the accessory 112a of the user 108a. The accessory 112a is operated to perform the set of actions in response to the at least one operational input received by the third set of users (i.e., the user 102a) of the second set of users 102 through the interface. The at least one operational input provided by the third set of users (i.e., the user 102a) of the second set of users 102 may include control commands generated using control options associated with the interface. In particular, the user 102a may be provided with control options for controlling the accessory 112a upon clicking the interface appended in the response. Thereafter, the user 102a may provide inputs using the control options to control the accessory 112a of the user 108a. The inputs provided using the control options correspond to the control commands. Similar to the above, the user 102a is provided with the provisions to control the accessory 112a of the user 108a based on the timing parameter.

In both scenarios as explained above, the response rendering module 224 may generate a control signal corresponding to the at least one operational input to operate the accessory 112a of the user 108a of the first set of users 108 to perform a set of actions.

In another scenario, the response may include the multimedia content associated with the user 108a. The multimedia content may be related to the sexual content of the user 108a. For example, the multimedia content may include images, videos, audio files, and the like. The response rendering module 224 may render the multimedia content of the user 108a to the user 102a based on the timing parameter (e.g., 4 minutes). That is, the access to the multimedia content for the user 102a may be denied upon the expiry of the timing parameter (e.g., 4 minutes) defined for the interaction tool. In an embodiment, the response rendering module 224 may render the multimedia content to the user 102a without defining the timing parameter for the shared multimedia content. In this scenario, the user 102a may access, save, or perform any operation on the multimedia content.

In addition, the response rendering module 224 is configured to determine the predefined response for the interaction result factor based on obtaining the null outcome. The predefined response for the null outcome may be stored in the database 118. Further, the predefined response is provided to the second set of users 102. For example, the predefined response may include control instructions for operating the sexual stimulation devices 106a-106n associated with the respective second set of users 102 or include the sexual content of the first set of users 108.

Furthermore, the outcome generation module 222 is configured to identify at least one user among the second set of users 102 upon selecting the third set of users for the interaction tool rendered by the first set of users 108. For example, the users 102a and 102b may participate or interact with the interaction tool rendered in the content by the user 108a of the first set of users 108. The users 102a and 102b may provide 260 tokens and 130 tokens within the predefined time period defined for the interaction tool. In this scenario, the user 102a is selected as the third set of users among the second set of users 102 to generate the at least one outcome of the interaction tool. In other words, the user 102a is determined to be the winner as the user 102a provides the highest number of tokens in the predefined time period to interact with the interaction tool. Further, the outcome generation module 222 determines the at least one user (such as the user 102b) among the second set of users 102. The at least one user (i.e., the user 102b) herein is referred to as a loser of the interaction tool rendered by the user 108a. In this scenario, the response rendering module 224 generates the response for the interaction result factor of the interaction tool. The response may include the sexual entertainment content associated with the at least one user (i.e., the user 102b) of the second set of users 102. Further, the response including the sexual entertainment content associated with the at least one user (i.e., the user 102b) of the second set of users 102 is provided to the third set of users (i.e., the user 102a) of the second set of users 102 listed in the at least one outcome of the interaction tool.

In some embodiments, the first set of users 108 may define the interaction result factor in the interaction tool rendered by the first set of users 108 to the second set of users 102. The interaction tool may be an example of a token proposal task. In this scenario, the second set of users 102 provides the at least one input data to participate in the proposal task (i.e., the interaction tool). For example, the second set of users 102 may provide the tokens as the at least one input data to participate in the token proposal task. In one example scenario, the users 102a and 102b may provide 100 tokens and 50 tokens in the token proposal task. The outcome generation module 222 is configured to determine the third set of users among the second set of users 102 for generating the at least one outcome of the token proposal task. The outcome generation module 222 may determine the user with a highest token proposal value (i.e., the set of interaction rules) as the third set of users for generating the at least one outcome of the token proposal task, In the above example scenario, the user 102a with the token proposal value of 100 tokens is determined as the third set of users for the at least one outcome of the token proposal task. Thereafter, the user 102a may be provided with the response as explained above.

FIGS. 3A, 3B, 3C, and 3D illustrate an exemplary representation of user interfaces (UIs) rendered to the second set of users 102 for interacting with an interaction tool rendered in a content of the first set of users 108 on the interactive platform 122, in accordance with an embodiment of the present disclosure.

Figure 3A:
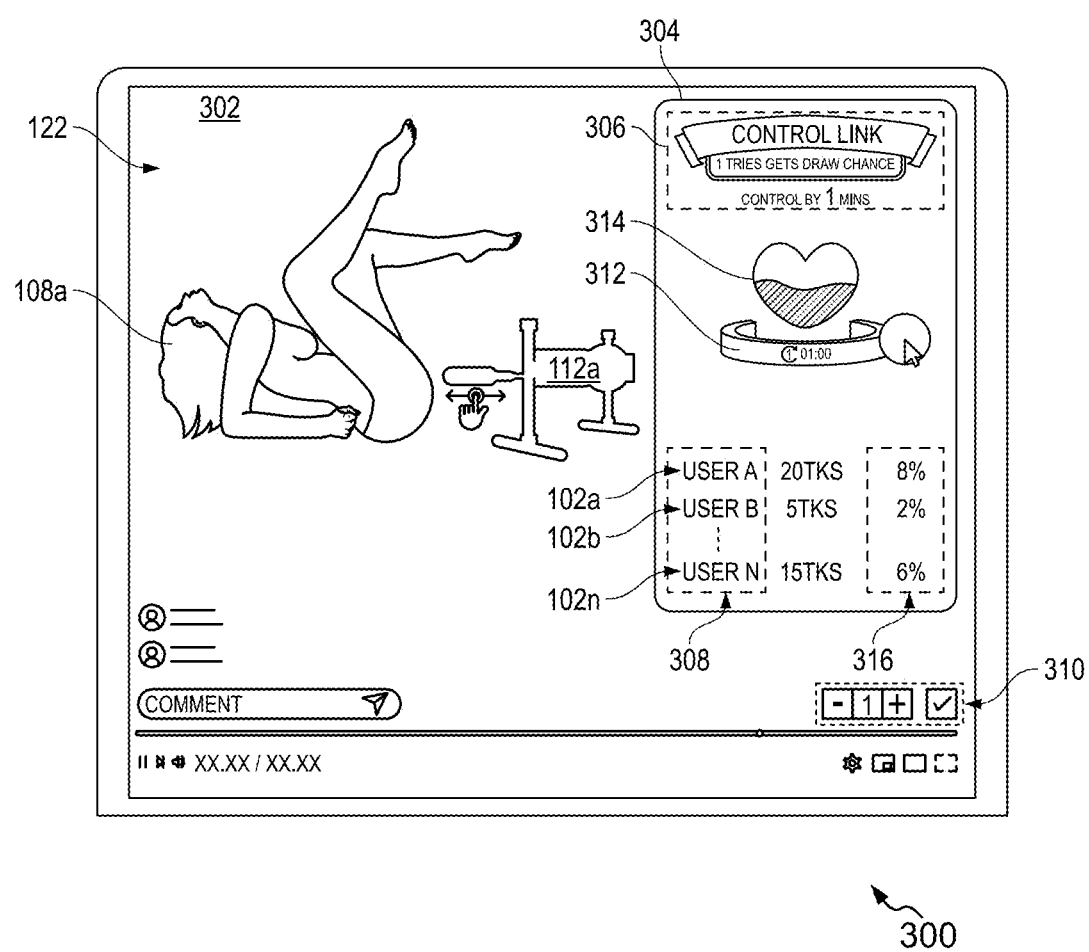
FIGS. 3A, 3B, 3C, and 3D illustrate an exemplary representation of user interfaces (UIs) rendered to a second set of users for interacting with an interaction tool rendered in content of a first set of users on an interactive platform, in accordance with an embodiment of the present disclosure.

Referring to FIG. 3A, illustrates an example representation of a user interface (UI) 300 depicting content 302 of a user (e.g., the user 108a) of the first set of users 108 rendered on the interactive platform 122. The second set of users 102 accesses the content 302 of the user 108a rendered in the interactive platform 122. As shown, the UI 300 is depicted to include an interaction tool 304 and an interaction result factor 306. As explained above, the interaction tool 304 and the interaction result factor 306 may be rendered by the user 108a based on the user inputs of the user 108a in the interactive platform 122. The interaction result factor 306 is exemplarily depicted to be 'CONTROL BY 1 MINS'. This indicates that the winner (or the third set of users selected among the second set of users 102) of the interaction tool 304 is provided with the response to control the accessory 112a of the user 108a for 1 minute. Herein, the factor '1 Mins' mentioned in the interaction result factor 306 corresponds to the timing parameter.

The second set of users 102 (or the users 102a, 102b, 102n) provides at least one input data (e.g., the tokens) by providing inputs on one or more buttons 310. Further, the UI 300 is depicted to include a profile information section 308. The profile information section 308 depicts a list of users such as the users 102a, 102b, 102n providing the tokens (or the at least one input data) to interact with the interaction tool 304. For example, the user 102a may provide 20 tokens, the user 102b may provide 5 tokens, and the user 102n may provide 15 tokens. In this scenario, the system 200 is configured to compute the progress of the interaction tool 304 based on the cumulative amount of the tokens provided by the users 102a, 102b, 102n. For illustration purposes, the progress of the interaction tool 304 is depicted using a progress indicator 314. The progress indicator 314 allows the users 102a, 102b, 102n to interact with the interaction tool 304 to achieve the objective defined by the interaction result factor 306 for the interaction tool 304.

Figure 3B:
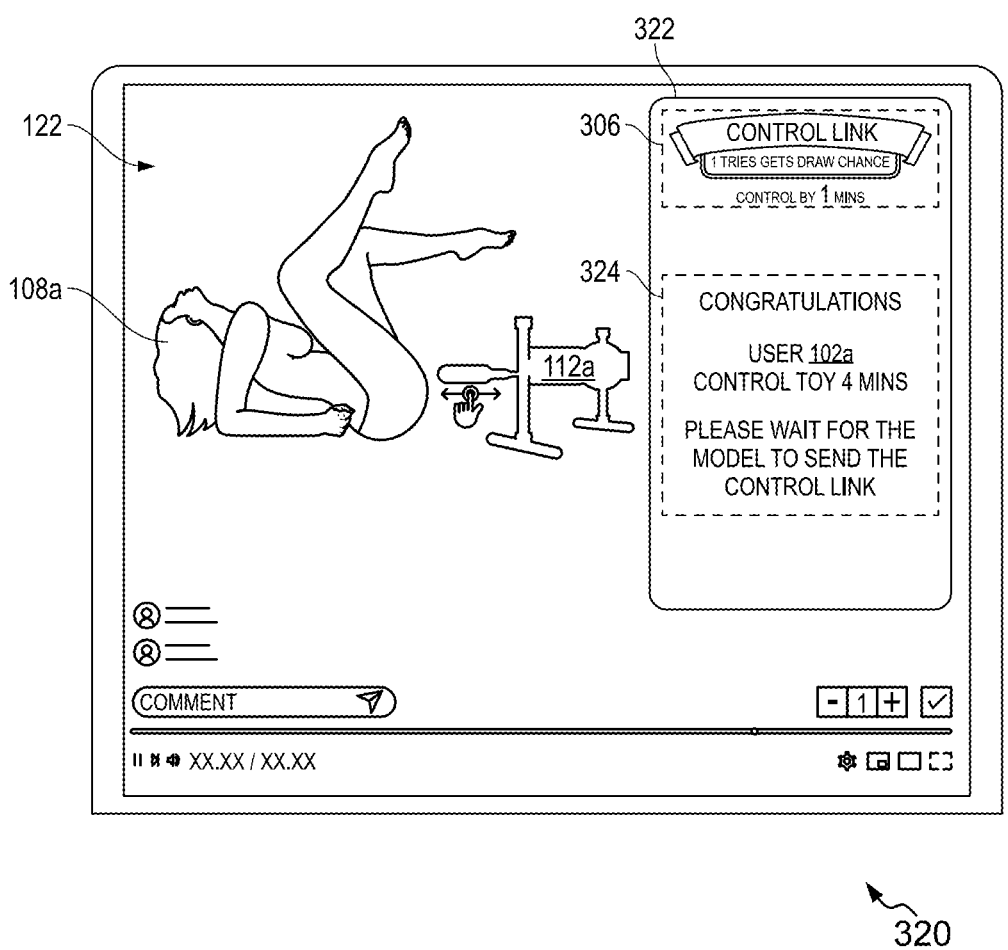

Further, the UI 300 is depicted to include a predefined time period 312 (exemplarily depicted to be '01:00'). The predefined time period 312 may be represented in minutes. The second set of users 102 may provide the at least one input data within the predefined time period 312 as explained above. Furthermore, the UI 300 is depicted to include an interaction level indicator section 316. The interaction level indicator section 316 includes the interaction level indicator (exemplarily depicted 8%, 2%, and 6%) as of the users 102a, 102b, . . . 102n interacting with the interaction tool 304. In this example scenario, the user 102a may be selected as the third set of users (i.e., the winner) for generating the at least one outcome of the interaction tool 304 as the interaction level indicator of the user 102a is highest among the users 102b, . . . 102n. The system 200 may render a user interface (UI) 320 (as shown in FIG. 3B) depicting at least one outcome 322 of the interaction tool 304. The at least one outcome 322 is depicted to include an information field 324 depicting the third set of users (e.g., the user 102a) selected as the winner of the interaction tool 304. Further, the information field 324 is depicted to include details defined (exemplarily depicted as 'CONTROL TOY FOR 1 MIN') in the interaction result factor 306. Further, in this scenario, the interaction result factor 306 defined for the interaction tool 304 may be predefined i.e., the interaction result factor 306 is a static value irrespective of the amount of the tokens provided by the users 102a, 102b, . . . 102n.

Figure 3C:
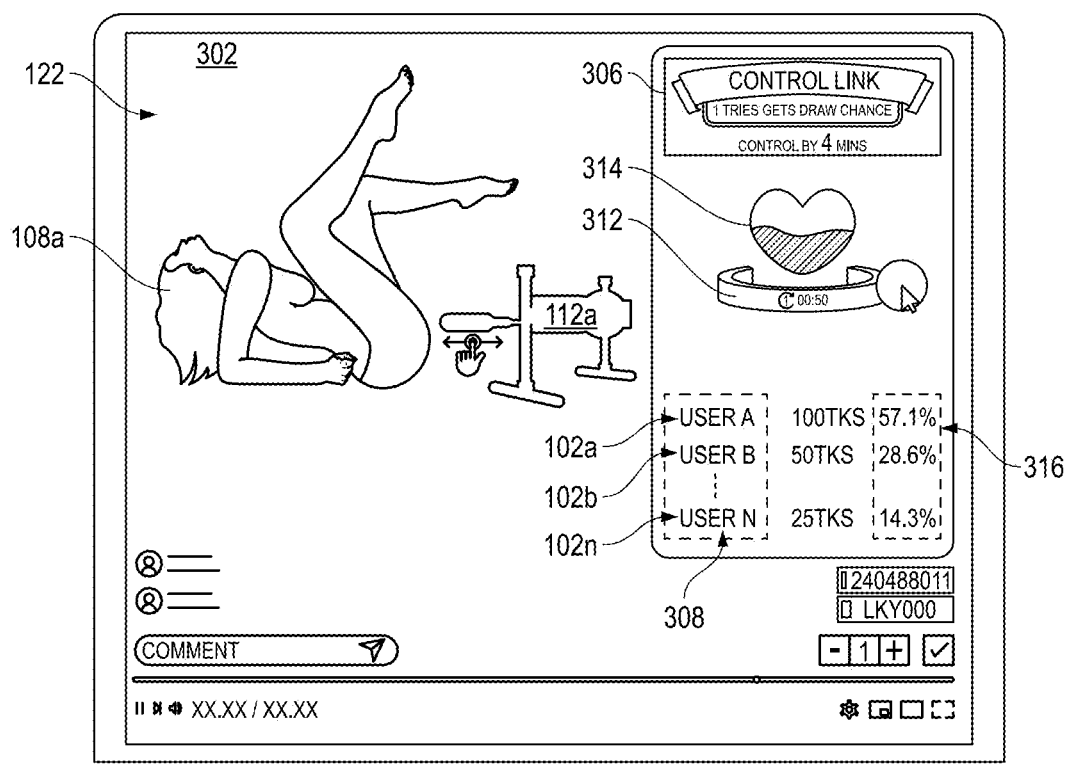
Figure 3D:
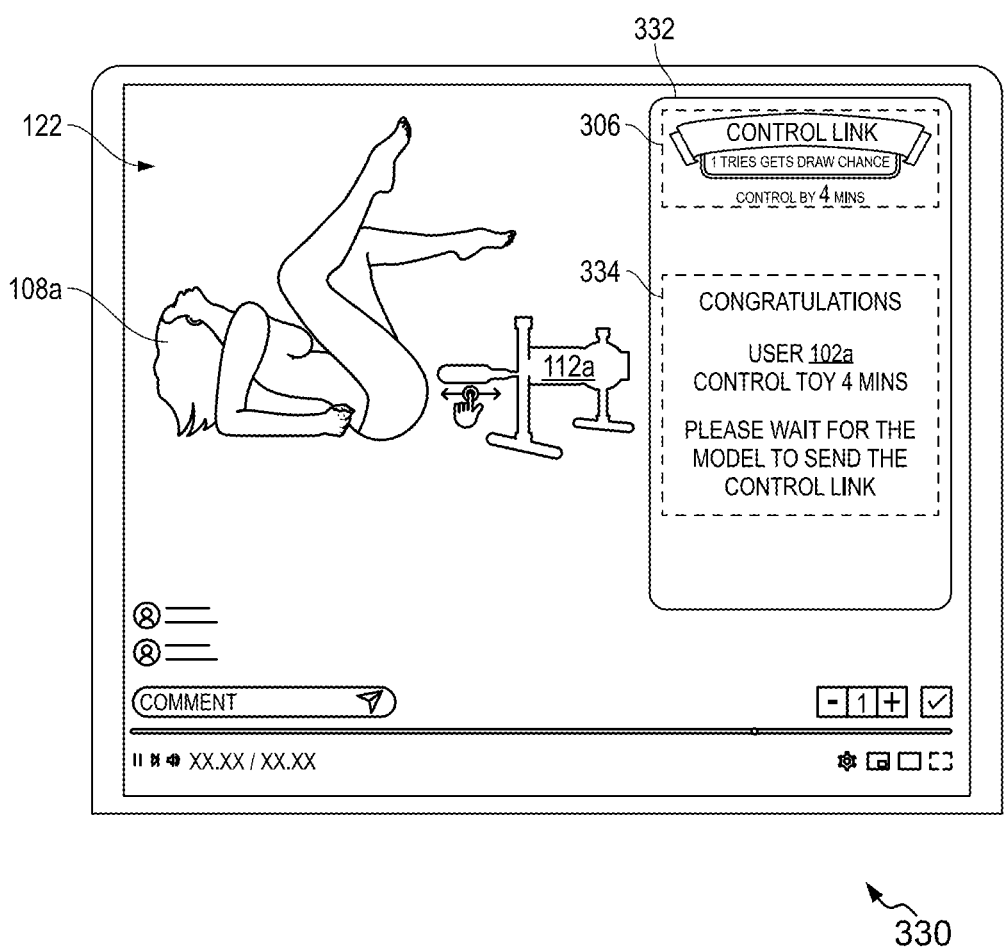

Referring to FIG. 3C, the second set of users 102 (or the users 102a, 102b, . . . 102n) may further provide tokens (or the at least one input data) to interact with the interaction tool 304. For example, the users 102a, 102b, . . . 102n may have provided total tokens of about 100, 50, . . . 25, respectively, within the predefined time period 312. Herein, the predefined time period 312 is exemplarily depicted to be '00:50' (i.e., 50 seconds). Further, the interaction result factor 306 defined for the interaction tool 304 is dynamically updated based on the tokens provided by the users 102a, 102b, . . . 102n at each instance within the predefined time period 312. It is to be noted that the timing parameter mentioned in the interaction result factor 306 is updated from 1 Min to 4 Mins based on the tokens provided by the users 102a, 102b, 102n. Furthermore, the interaction level indicator for each of the users 102a, 102b, . . . 102n is updated based on the total tokens provided by the users 102a, 102b, . . . 102n. For example, the interaction level indicator for the users 102a, 102b, . . . 102n is exemplarily depicted as 57.1%, 28.6%, and 14.3%, respectively (see, 316). In this example scenario, the user 102a may be selected as the third set of users (i.e., the winner) for generating the at least one outcome of the interaction tool 304 as the interaction level indicator of the user 102a is highest among the users 102b, . . . 102n. The system 200 may render a user interface (UI) 330 (as shown in FIG. 3D) depicting at least one outcome 332 of the interaction tool 304. The at least one outcome 332 is depicted to include an information field 334 depicting the third set of users (e.g., the user 102a) selected as the winner of the interaction tool 304. Further, the information field 334 is depicted to include details defined (exemplarily depicted as 'CONTROL TOY FOR 4 MINS') in the interaction result factor 306.

Figure 4A:
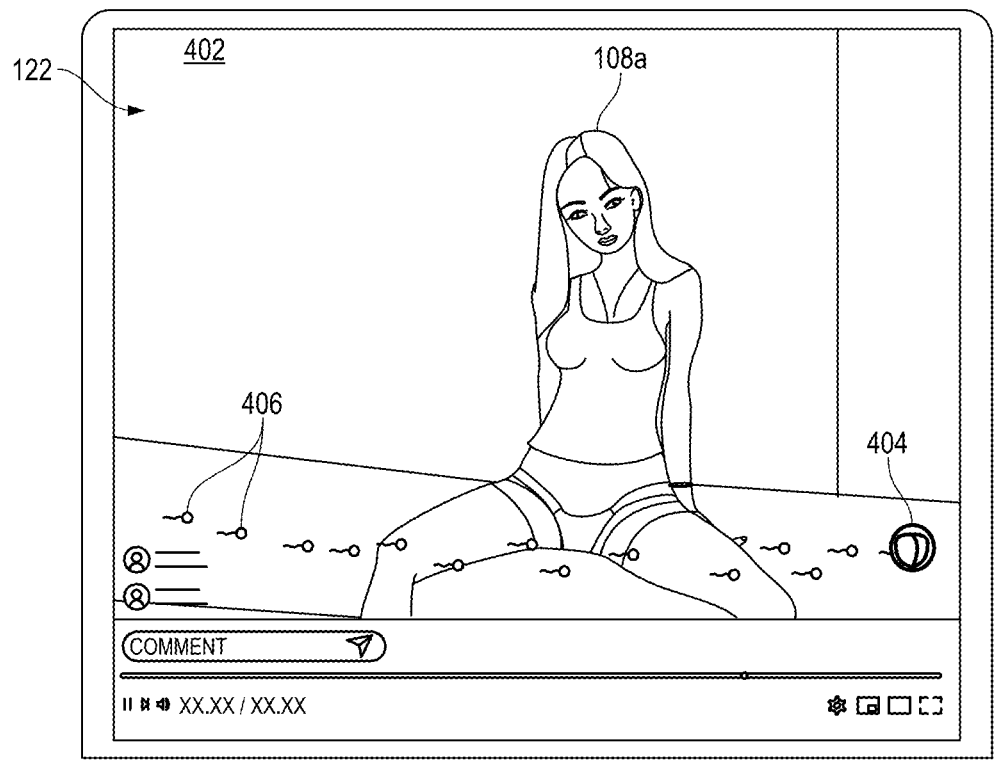
FIGS. 4A and 4B illustrate an exemplary representation of user interfaces (UIs) rendered to the second set of users for interacting with the interaction tool rendered in content of the first set of users on the interactive platform, in accordance with an embodiment of the present disclosure.
Figure 4B:
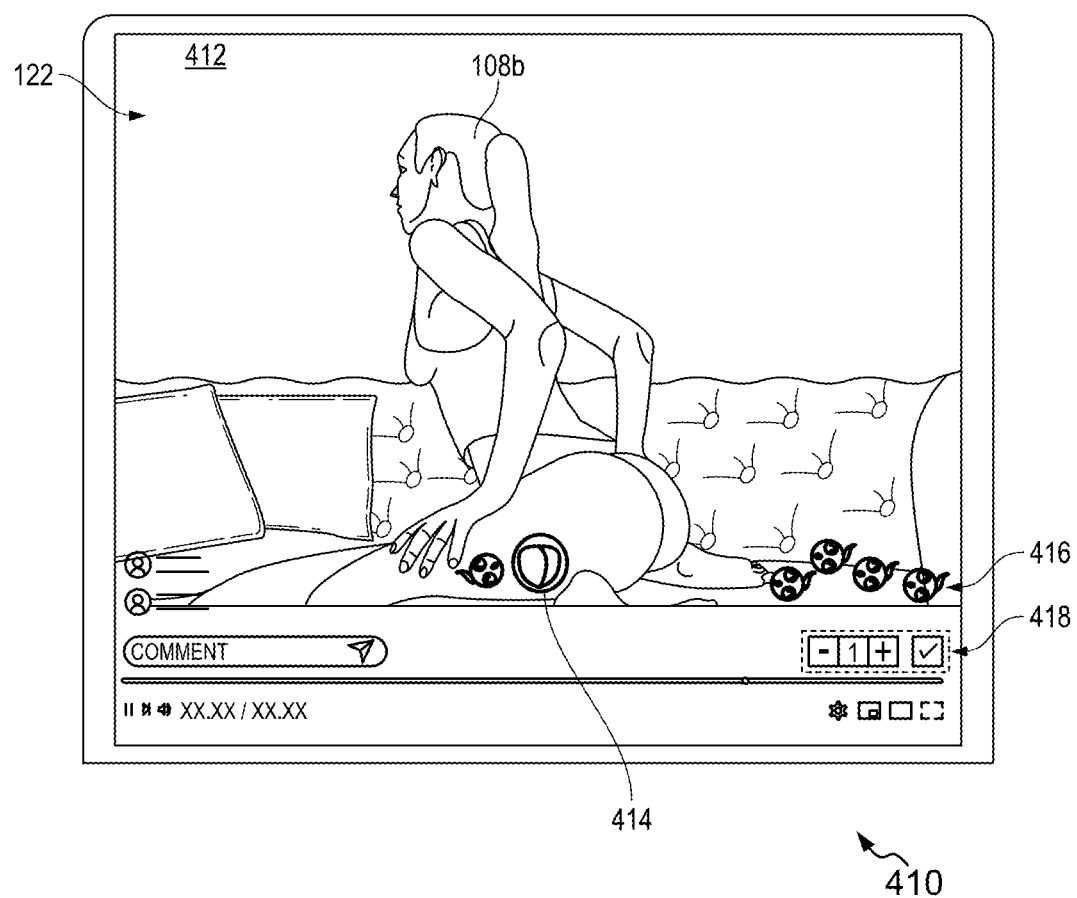

FIGS. 4A and 4B illustrate an exemplary representation of user interfaces (UIs) rendered to the second set of users 102 for interacting with an interaction tool rendered in a content of the first set of users 108 on the interactive platform 122, in accordance with an embodiment of the present disclosure.

Referring to FIG. 4A, an example representation of a user interface (UI) 400 depicting content 402 performed by a user (e.g., the user 108a) of the first set of users 108 is illustrated. The second set of users 102 accesses the content 402 of the user 108a rendered in the interactive platform 122 on their respective user devices. The UI 400 is depicted to include an interaction tool 404. Further, each user of the second set of users 102 may be allowed to interact with the interaction tool 404 via a virtual element (see, 406). In other words, each user of the second set of users 102 is provided with the virtual element 406 to interact with the interaction tool 404 rendered in the interactive platform 122. The virtual element 406 is exemplarily depicted as a tadpole (representing sperm). The virtual element 406 of each of the second set of users 102 is configured to move towards the interaction tool 404 based on the at least one input data of the corresponding second set of users 102. For example, the at least one input data may be the duration of the second set of users 102 in the content 402 rendered on the interactive platform 122. In other words, the at least one input data includes the online time of the second set of users 102 in the content 402. Based on the duration of the second set of users 102, the virtual element 406 moves towards the interaction tool 404 to fuse with the interaction tool 404. Thus, the functionality of the virtual element 406 to move towards the interaction tool 404 to fuse with the interaction tool 404 based on the duration of the second set of users 102 in the content 402 corresponds to the set of interaction rules of the interaction tool 404. Further, the virtual element 406 associated with a user (e.g., the user 102a) among the second set of users 102 that interacts (or fuse) with the interaction tool 404 is selected as the third set of users. Furthermore, the at least one outcome including the third set of users (e.g., the user 102a) is generated for the interaction tool 404. Thereafter, the user 102a may be provided with the response based on the interaction result factor defined for the interaction tool 404.

Referring to FIG. 4B, an example representation of a user interface (UI) 410 depicting content 412 performed by a user (e.g., the user 108b) of the first set of users 108 is illustrated. The second set of users 102 accesses the content 412 of the user 108b rendered in the interactive platform 122 on their respective user devices. The UI 410 is depicted to include an interaction tool 414. Further, each user of the second set of users 102 may be allowed to interact with the interaction tool 414 via a virtual element (see, 416). In other words, each user of the second set of users 102 is provided with the virtual element 416 to interact with the interaction tool 414 rendered in the interactive platform 122. The virtual element 416 is exemplarily depicted as a tadpole (representing sperm). The virtual element 416 of each of the second set of users 102 is configured to move towards the interaction tool 414 based on the at least one input data of the corresponding second set of users 102. For example, the at least one input data may be the duration of the second set of users 102 in the content 412 rendered on the interactive platform 122. Based on the duration of the second set of users 102, the virtual element 416 moves towards the interaction tool 414 to fuse with the interaction tool 414. Thus, the functionality of the virtual element 416 to move towards the interaction tool 414 to fuse with the interaction tool 414 based on the duration of the second set of users 102 in the content 412 corresponds to the set of interaction rules of the interaction tool 414. In addition, the second set of users 102 may provide the at least one input data using interface 418 rendered in the content 412. For example, the second set of users 102 may provide the tokens (i.e., the at least one input data) using the interface 418. In this scenario, the at least one input data (e.g., the tokens) may result in an increase in traversing speed of the virtual element 416 based on the number of tokens provided by the corresponding second set of users 102. Further, the virtual element 416 associated with a user (e.g., the user 102a) among the second set of users 102 that interacts (or fuse) with the interaction tool 414 is selected as the third set of users. Furthermore, the at least one outcome including the third set of users (e.g., the user 102a) is generated for the interaction tool 414. Thereafter, the user 102a may be provided with the response based on the interaction result factor defined for the interaction tool 414.

Figure 5:
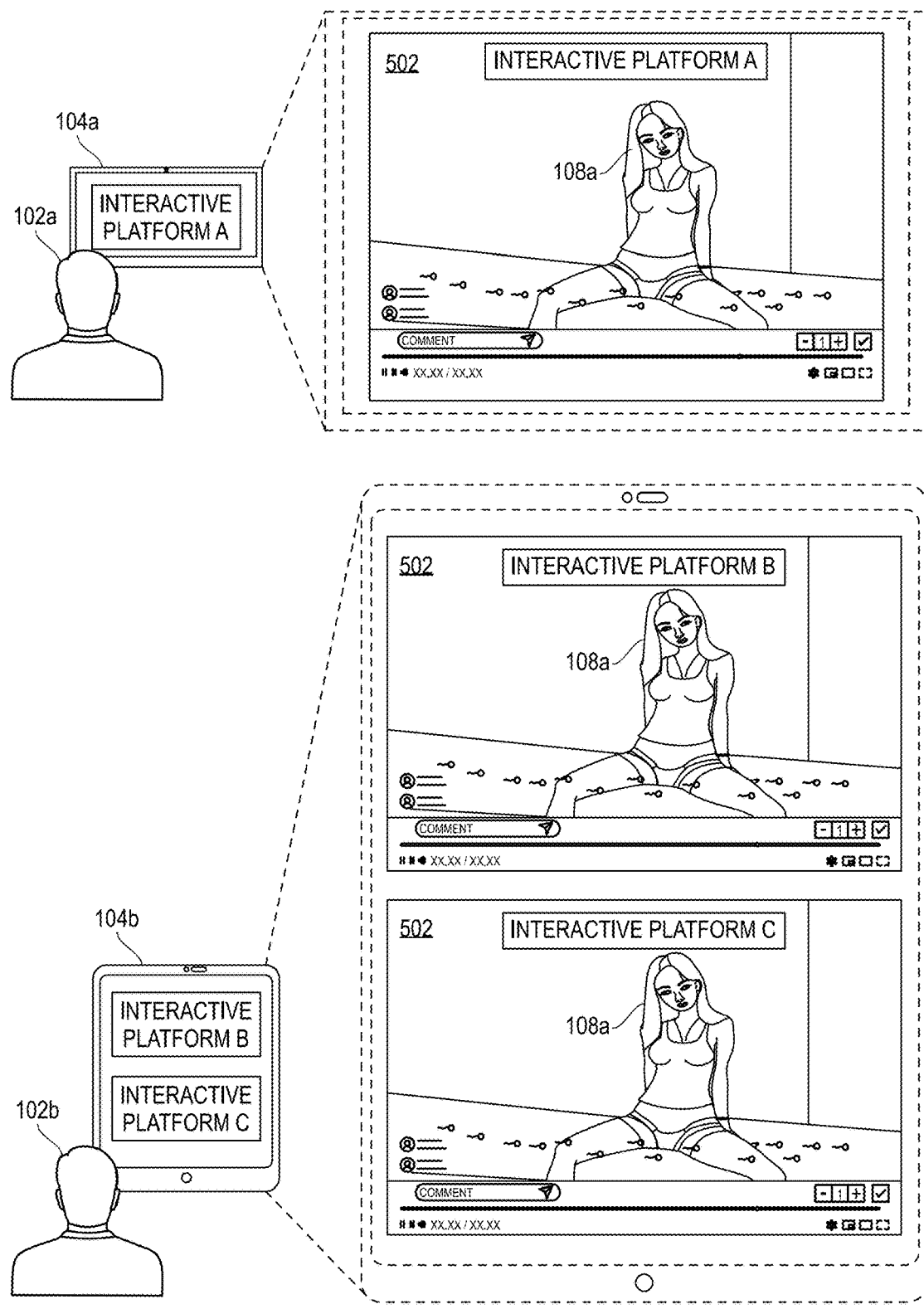
FIG. 5 illustrates an example scenario depicting content of a user of the first set of users rendered in multiple interactive platforms, in accordance with an embodiment of the present disclosure.

FIG. 5 illustrates an example scenario 500 depicting content of a user (e.g., the user 108a) of the first set of users 108 rendered in multiple interactive platforms, in accordance with an embodiment of the present disclosure. As shown, the user 108a of the first set of users 108 renders content 502 in multiple interactive platforms such as an interactive platform A, an interactive platform B, and an interactive platform C. The interactive platform A may be hosted and managed by the system 200/120. The interactive platforms B and C may be hosted and managed by third-party streaming servers 116. The system 200 may be communicably coupled to the third-party streaming servers 116 for managing the content rendered by the first set of users 108 in the interactive platforms B and C that are managed by the third-party streaming servers 116. The interactive platforms B and C may be referred to as third-party streaming platforms.

In this scenario, the second set of users 102 may access the content 502 by accessing the interactive platforms A, B, or C. For example, the user 102a may access the content 502 on the interactive platform A and the user 102b may access the content 502 on the interactive platforms B and C. Further, the user 102a may provide the at least one input data (e.g., the tokens) to interact with an interaction tool rendered in the content 502. The user 102b may provide the at least one input data (e.g., the tokens) to interact with an interaction tool 506 rendered in the content 502. In this scenario, the system 200 is configured to monitor the at least one input data associated with the user 102a in the content 502 rendered on the interactive platform A and the at least one input data associated with the user 102b in the content 502 rendered on the interactive platforms B and C. In general, the at least one input data of the second set of users 102 is sourced from at least the third-party streaming platforms (i.e., the interactive platforms B and C) streaming the content 502 of the first set of users 108 and the interactive platform A (i.e., the interactive platform 122) managed by the system 200.

Thereafter, the system 200 computes the cumulative amount of the tokens received for the content 502 rendered on the interactive platforms A, B, and C. Further, the at least one input data (or the tokens) collected from different streaming platforms (i.e., the interactive platforms B, and C) may be converted based on a token conversion value defined for the interactive platform A. For example, the token conversion value for the interactive platform B may be defined as 1 and the token conversion value for the interactive platform C may be defined as 0.5. The user 102a may provide 50 tokens in the content 502 rendered on the interactive platform A, and the user 102b may provide 50 tokens (i.e., the at least one input data) in the content 502 rendered on the interactive platforms B and C. In this scenario, the system 200 may apply the token conversion value for the 50 tokens provided by the user 102b in the content 502 rendered on the interactive platforms B and C. For example, 50 tokens rendered in the interactive platform B may be equivalent to 50 tokens based on applying the token conversion value of 1, and 50 tokens rendered in the interactive platform C is equivalent to 100 tokens by applying the token conversion value of 0.5.

Figure 6:
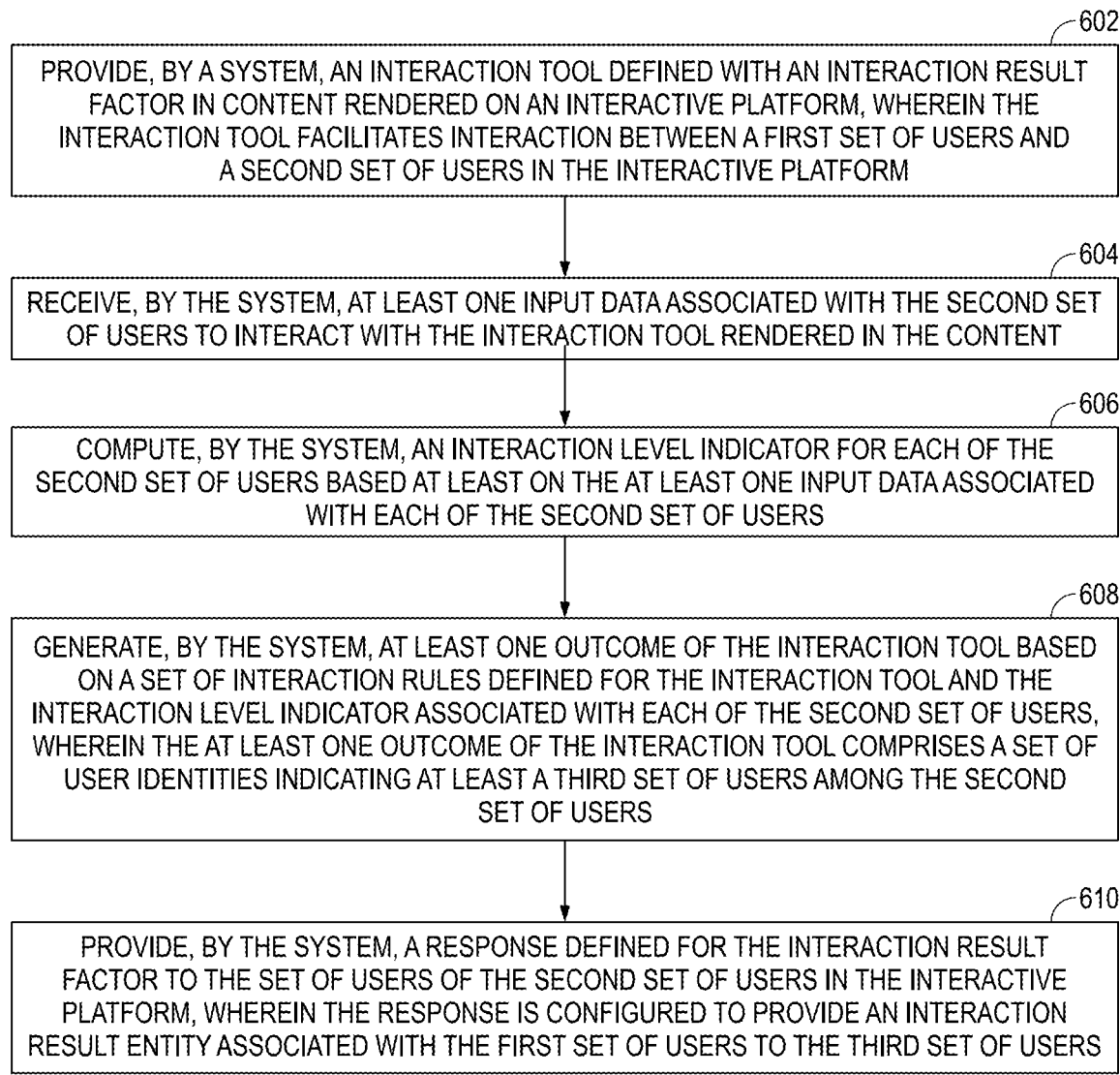
FIG. 6 illustrates a flow diagram of a computer-implemented method for providing an interactive sexual entertainment platform, in accordance with an embodiment of the present disclosure.

FIG. 6 illustrates a flow diagram of a computer-implemented method 600 for providing an interactive sexual entertainment platform, in accordance with an embodiment of the present disclosure. The method 600 depicted in the flow diagram may be executed by, for example, the system 200. Operations of the flow diagram of the method 600, and combinations of the operations in the flow diagram of the method 600, may be implemented by, for example, hardware, firmware, a processor, circuitry, and/or a different device associated with the execution of software that includes one or more computer program instructions. It is noted that the operations of the method 600 can be described and/or practiced by using a system other than the system 200. The method 600 starts at operation 602.

At operation 602, the method 600 includes providing, by the system 200, an interaction tool defined with an interaction result factor in content rendered on the interactive platform 122. The interaction tool facilitates interaction between the first set of users 108 and the second set of users 102 in the interactive platform 122.

At operation 604, the method 600 includes receiving, by the system 200, at least one input data associated with the second set of users 108 to interact with the interaction tool rendered in the content.

At operation 606, the method 600 includes computing, by the system 200, an interaction level indicator for each of the second set of users 102 based at least on the at least one input data associated with each of the second set of users 102.

At operation 608, the method 600 includes generating, by the system 200, at least one outcome of the interaction tool based on a set of interaction rules defined for the interaction tool and the interaction level indicator associated with each of the second set of users 102. The at least one outcome of the interaction tool includes a set of user identities indicating at least a third set of users among the second set of users 102.

At operation 610, the method 600 includes providing, by the system 200, a response defined for the interaction result factor to the third set of users of the second set of users 102 in the interactive platform 122. The response is configured to provide an interaction result entity associated with the first set of users 108 to the third set of users. The one or more operations related to rendering the interactive sexual entertainment platform are explained with references to FIGS. 1 to 5, therefore they are not reiterated herein for the sake of brevity.

Figure 7:
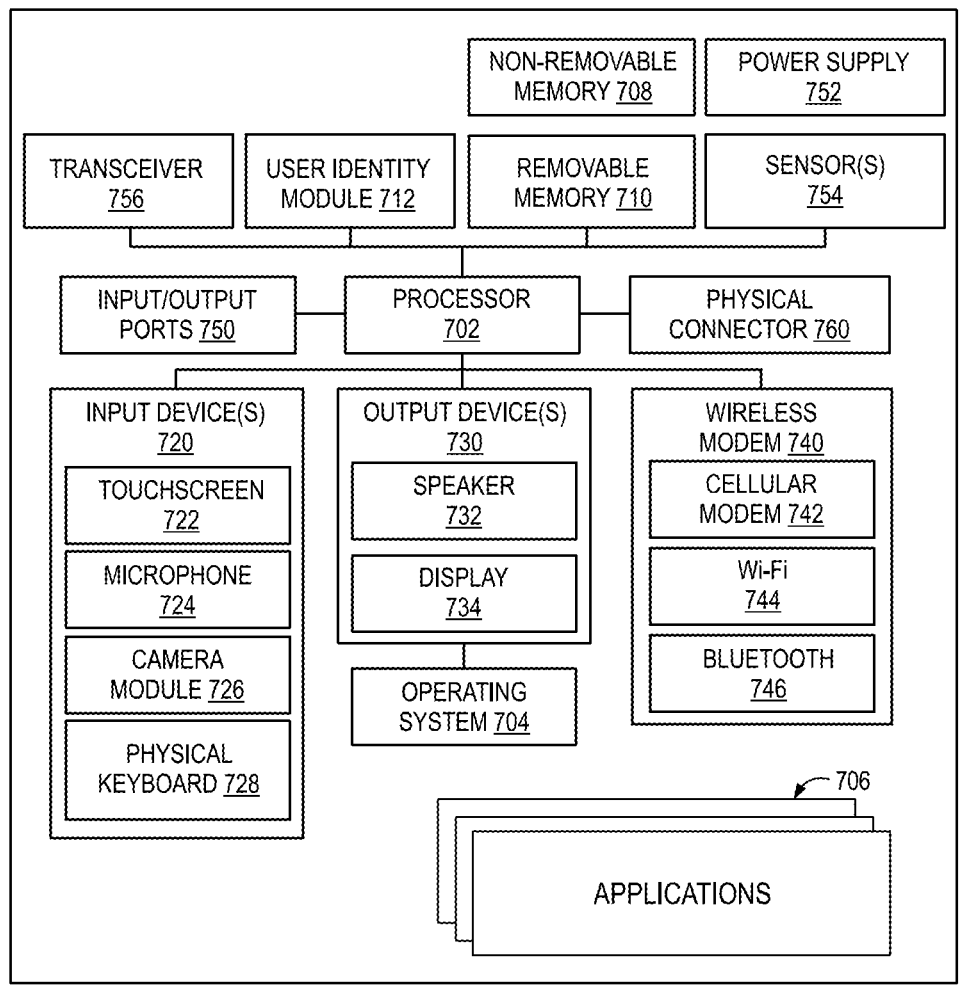
FIG. 7 is a simplified block diagram of an electronic device capable of implementing various embodiments of the present disclosure.

FIG. 7 is a simplified block diagram of an electronic device 700 capable of implementing various embodiments of the present disclosure. For example, the electronic device 700 may correspond to the user devices 104a-104n, and the user terminals 110a-110b of FIG. 1. The electronic device 700 is depicted to include one or more applications 706. For example, the one or more applications 706 may include the interactive platform 122 of FIG. 1. The one or more applications 706 installed on the electronic device 700 is capable of communicating with a server (i.e., the system 200 or the system 120) to render an interactive sexual entertainment platform.

It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an embodiment may include more, less, or different components than those described in connection with the embodiment of the FIG. 7. As such, among other examples, the electronic device 700 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and supports one or more operations of the application (see, the applications 706) that implements one or more of the innovative features described herein. In addition, the applications 706 may include common mobile computing applications (e.g., telephony applications, email applications, calendars, contact managers, web browsers, messaging applications) or any other computing application.

The illustrated electronic device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device, or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700 and biometric sensors for scanning biometric identity of an authorized user, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
providing, by a system, an interaction tool defined with an interaction result factor in content rendered on an interactive platform, the interaction tool facilitating interaction between a first set of users and a second set of users in the interactive platform;
receiving, by the system, at least one item of input data associated with an input by each of the second set of users during interaction with the interaction tool rendered in the content;
computing, by the system, an interaction level indicator for each of the second set of users based at least on the at least one item of input data associated with each of the second set of users;
generating, by the system, at least one outcome of the interaction tool based on (i) a set of interaction rules defined for the interaction tool and (ii) the interaction level indicator associated with each of the second set of users, the at least one outcome of the interaction tool comprising a set of user identities indicating at least a third set of users defined as a subset of the second set of users; and
providing, by the system, a response defined for the interaction result factor to the third set of users defined as the subset of the second set of users in the interactive platform, the response being configured to provide an interaction result entity associated with the first set of users to the third set of users.

2. The computer-implemented method as claimed in claim 1, further comprising:
activating, by the system, at least one control feature of an accessory associated with the first set of users for the third set of users based on a set of instructions appended to the response transmitted to the third set of users;
upon activating the at least one control feature of the accessory, receiving, by the system, at least one item of operational input from the third set of users; and
generating, by the system, a control signal to operate the accessory of the first set of users to perform a set of actions in response to the at least one item of operational input received from the third set of users.

3. The computer-implemented method as claimed in claim 2, wherein the at least one item of operational input comprises motion data generated by the third set of users based on operation of a sexual stimulation device associated with the third set of users.

4. The computer-implemented method as claimed in claim 2, further comprising:
transmitting, by the system, the response appended with an interface for the accessory associated with the first set of users, the interface corresponding to the interaction result entity; and
receiving, by the system, the at least one item of operational input from the third set of users through the interface,
wherein the accessory is operated to perform the set of actions in response to the at least one item of operational input received from the third set of users through the interface,
wherein the content is rendered by the first set of users to the second set of users in the interactive platform, and wherein the at least one item of operational input received from the third set of users comprises control commands generated using control options associated with the interface.

5. The computer-implemented method as claimed in claim 2, wherein the set of instructions appended to the response to activate the at least one control feature of the accessory comprises a timing parameter to operate the at least one control feature of the accessory in the content.

6. The computer-implemented method as claimed in claim 1, wherein the at least one item of input data comprises at least one of a number of tokens provided by the second set of users, a duration of viewing the content rendered on the interactive platform by the second set of users, profile information of the second set of users, and one or more parameters associated with the interactive platform, the one or more parameters comprising at least one of a number of viewers of the content and a platform identity associated with the second set of users.

7. The computer-implemented method as claimed in claim 1, further comprising:
determining, by the system, a cumulative amount of the at least one item of input data received from the second set of users; and
computing, by the system, the interaction level indicator for each user of the second set of users based at least on an amount of the at least one item of input data associated with each user of the second set of users and the cumulative amount of the at least one item of input data received from the second set of users.

8. The computer-implemented method as claimed in claim 1, further comprising:
determining, by the system, the interaction result factor as a reference result factor for a subsequent interaction tool rendered in the interaction platform based on obtaining a null outcome.

9. The computer-implemented method as claimed in claim 8, further comprising:
determining, by the system, a predefined response for the interaction result factor based on obtaining the null outcome,
wherein the predefined response is provided to the second set of users.

10. The computer-implemented method as claimed in claim 1, wherein the interaction result factor is dynamically updated based at least on the at least one item of input data received from the second set of users.

11. The computer-implemented method as claimed in claim 1, wherein a quantified value of the interaction result entity corresponding to the interaction result factor is positively correlated with a total quantified value of the at least one item of input data received from the second set of users.

12. The computer-implemented method as claimed in claim 11, wherein the quantified value of the interaction result entity is one of greater than and equal to a quantified value of the at least one item of input data received from each user of the second set of users.

13. The computer-implemented method as claimed in claim 1, wherein the at least one outcome of the interaction tool is determined based at least on identifying that the interaction level indicator associated with the third set of users among the second set of users is greater than an interaction level of remaining users among the second set of users.

14. The computer-implemented method as claimed in claim 1, further comprising:
  identifying, by the system, at least one user of the second set of users upon determining the third set of users among the second set of users to generate the at least one outcome of the interaction tool; and
  generating, by the system, the response defined for the interaction result factor associated with the interaction tool, the response comprising the interaction result entity associated with the at least one user of the second set of users,
  wherein the response comprising the interaction result entity associated with the at least one user of the second set of users is provided to the third set of users of the second set of users listed in the at least one outcome of the interaction tool, the interaction result entity comprising sexual entertainment content associated with the at least one user of the second set of users.

15. The computer-implemented method as claimed in claim 1, wherein the at least one item of input data associated with the second set of users is sourced from at least third-party streaming platforms streaming the content of the first set of users and the interactive platform, or from more than one interactive platform.

16. The computer-implemented method as claimed in claim 1, wherein the interaction result entity comprises sexual entertainment content associated with the first set of users, the sexual entertainment content comprising at least operating parameters for controlling an accessory of the first set of users and multimedia data of the first set of users.

17. A system, comprising:
  a communication interface;
  a memory storing executable instructions; and
  a processor operatively coupled with the communication interface and the memory, the processor being configured to execute the executable instructions to control the system to execute processes comprising:
    providing an interaction tool defined with an interaction result factor in content rendered on an interactive platform, the interaction tool facilitating interaction between a first set of users and a second set of users in the interactive platform;
    receiving at least one item of input data associated with an input by each of the second set of users during interaction with the interaction tool rendered in the content;
    computing an interaction level indicator for each of the second set of users based at least on the at least one item of input data associated with each of the second set of users;
    generating at least one outcome of the interaction tool based on (i) a set of interaction rules defined for the interaction tool and (ii) the interaction level indicator associated with each of the second set of users, the at least one outcome of the interaction tool comprising a set of user identities indicating at least a third set of users defined as a subset of the second set of users; and
    generating a response defined for the interaction result factor to the third set of users defined as the subset of the second set of users in the interactive platform, the response being configured to provide an interaction result entity associated with the first set of users to the third set of users.

18. The system as claimed in claim 17, the processes further comprising:
  activating at least one control feature of an accessory associated with the first set of users for the third set of users based on a set of instructions appended to the response transmitted to the third set of users;
  upon activating the at least one control feature of the accessory, receiving at least one item of operational input from the third set of users through the interactive platform; and
  generating a control signal to operate the accessory of the first set of users to perform a set of actions in response to the at least one item of operational input received from the third set of users.

19. The system as claimed in claim 17, the processes further comprising:
  determining a cumulative amount of the at least one item of input data received from the second set of users; and
  computing the interaction level indicator for each user of the second set of users based at least on an amount of the at least one item of input data associated with each user of the second set of users and the cumulative amount of the at least one item of input data received from the second set of users.

20. A non-transitory computer-readable storage medium storing computer-executable instructions that, when executed by a processor of a system, control the system to execute processes comprising:
  providing an interaction tool defined with an interaction result factor in content rendered on an interactive platform, the interaction tool facilitating interaction between a first set of users and a second set of users in the interactive platform;
  receiving at least one item of input data associated with an input by each of the second set of users during interaction with the interaction tool rendered in the content;
  computing an interaction level indicator for each of the second set of users based at least on the at least one item of input data associated with each of the second set of users;
  generating at least one outcome of the interaction tool based on (i) a set of interaction rules defined for the interaction tool and (ii) the interaction level indicator associated with each of the second set of users, the at least one outcome of the interaction tool comprising a set of user identities indicating at least a third set of users defined as a subset of the second set of users; and
  providing a response defined for the interaction result factor to the third set of users defined as the subset of the second set of users in the interactive platform, the response being configured to provide an interaction result entity associated with the first set of users to the third set of users.

\* \* \* \* \*